Oct. 10, 1961 C. D. LAUGHLIN 3,003,641
CONTINUOUS PERCOLATION APPARATUS
Filed July 25, 1958 3 Sheets-Sheet 1

INVENTOR.
CARL D. LAUGHLIN
BY
ATTORNEY

Oct. 10, 1961     C. D. LAUGHLIN     3,003,641
CONTINUOUS PERCOLATION APPARATUS

Filed July 25, 1958     3 Sheets-Sheet 2

INVENTOR.
CARL D. LAUGHLIN

BY

ATTORNEY

Oct. 10, 1961  C. D. LAUGHLIN  3,003,641
CONTINUOUS PERCOLATION APPARATUS
Filed July 25, 1958  3 Sheets-Sheet 3

INVENTOR.
CARL D. LAUGHLIN
BY
ATTORNEY ns # United States Patent Office 3,003,641
Patented Oct. 10, 1961

3,003,641
CONTINUOUS PERCOLATION APPARATUS
Carl D. Laughlin, North Brunswick, N.J., assignor to Minerals & Chemicals Philipp Corporation, a corporation of Maryland
Filed July 25, 1958, Ser. No. 751,018
5 Claims. (Cl. 210—189)

The instant invention relates to an improved continuous countercurrent percolation apparatus for contacting a liquid with a particulate solid moving downwardly through a contact zone in the form of a confined mass. The invention relates, more particularly, to such an apparatus in which means are provided for continuously removing the solid discharge uniformly over the entire base of the columnar mass and in a manner substantially to obviate degradation of solid and prevent turbulence of the residual solid in the columnar mass during movement of said residual solid through the contact zone.

Many processes involve the contact of particulate solids of a grandular nature with liquids as, for example, the separation of liquid organic mixtures into two or more fractions by the use of said adsorbents of natural or synthetic origin, various ion exchange reactions, such as contacting an appropriate liquid with a zeolitic material, decolorization of sugar solutions by passage through solids selectively adsorbent to color body impurities in the solutions, and leaching of inorganic and organic particulate solids by a suitable liquid, inorganic or organic, as the case may be. Such particulate solids are granular, as distinguished from powdered solids and usually have an average particle size within the range of from about 4- to 100-mesh as measured by the Tyler Standard screen. The particles of solid may be round, such as spheres or spheroids, or they may be irregular in shape.

In carrying out such processes, it has heretofore been the conventional practice to employ a batch percolation process which involves percolating the liquid through a stationary bed of solid until said solid is spent or otherwise ready for discharge. The disadvantages of fixed bed or batch percolation processes are many and well-known to those skilled in the art. For this reason so-called continuous percolation processses have been proposed, particularly such processes directed to the treatment of liquid organic mixtures with solid adsorbents to fractionate the liquid into two or more fractions. Broadly, these adsorption processes, as exemplified by those disclosed in U.S. Patents Nos. 2,470,339 and 2,564,717, involve introducing granular adsorbent into an adsorption zone and passing it therethrough in the form of a moving column. The fluid feed is continuously introduced into and passes through the adsorption zone in a direction opposite to the direction of passage of the adsorbent. A nonadsorbed fraction of the fluid feed is removed from the adsorption zone at a point adjacent the point of introduction of the adsorbent. The spent or partially spent adsorbent is removed from the adsorption zone at a point adjacent the point of introduction of the fluid feed. The spent adsorbent is regenerated continuously in associated equipment and returned to the adsorption column.

Related processes, such as ion exchange reactions between liquids and solids, certain leaching operations as well as decolorization of certain aqueous solutions, may be conducted by analogous processes which involve continuous countercurrent contact of a liquid feed with a moving column of particulate solid. The efficiency of such processes is dependent upon maintaining true countercurrent flow of the feed and the confined particulate solid in the contact zone and, accordingly, any substantial turbulence of the particulate solid in passing through the liquid-solid contact zone or channeling of liquid therein has an effect upon the operation.

One of the most effective methods for accomplishing countercurrent contact of a liquid with a particulate solid involves continuously passing a columnar mass of particulate solid downwardly and causing liquid to flow upwardly through said mass. The solid discharge in such continuous percolation operations is frequently removed by a bucket elevator, or the equivalent, from the base of a gravitating columnar mass of the solid. However, since by such means discharge is from only one point at the base of the columnar mass, the particulate solid progresses more rapidly through some portions of the contact zone than others with the result that undersirable turbulence sets in and impairs the efficiency of the operation. Furthermore, some of the prior art systems have restrictions adjacent the lower end of the percolation zone which likewise causes a departure from true countercurrent flow.

U.S. Patent No. 2,762,510 to Harry M. Gwyn and Carl D. Laughlin discloses an improved apparatus for operating a continuous percolation process, particularly adapted for fractionation of liquid organic mixtures by solid adsorbents. The apparatus of said patent obviates substantially the aforementioned difficulties in that the apparatus is so constructed and arranged that the feed mixture passes upwardly through a gravitating columnar mass of adsorbent in substantially true countercurrent flow, thereby realizing a maximum efficiency of operation. This patentees accomplish by the provision of an apparatus in which there is included an elevating screw confined within the contacting zone and in contact with the base of the columnar mass of adsorbent. A plurality of collection vanes are mounted on a rotatable plate and extend substantially between the outer edge of the elevating screw and the wall of the adsorption column in such a manner that when rotated with the plate causes the adsorbent contacted therewith to be moved inwardly from the wall of the adsorption column into contact with the elevating screw and to be removed upwardly in a confined path within the contact zone by the elevating screw. A further and important advantage of the system of Gwyn et al. is that the amount of entrained liquid withdrawn with the particulate solid from the base of the contact zone is small as compared with the amount removed in other prior art systems.

Although the continuous percolation apparatus disclosed in the aforementioned patent to Gwyn et al. successfully performs its intended function and permits the performance of a highly efficient continuous process, nevertheless, one disadvantage inherent in the apparatus is that the particulate solid tends to be attrited during operation. Loss of particulate solid in the form of fines impairs the economic operation of the apparatus in that the fines discarded after discharge from the apparatus represent an economic loss. Such degradation of particulate solid, particularly degradation by attrition, varies in degree with the physical properties of the solid, particularly the compressive strength of the solid and is evident when fuller's earth, bauxite and the like are employed in the apparatus.

Another disadvantage of the system of Gwyn et al. is that the rotatable element, being adapted to support substantially the entire weight of the columnar mass, is large and hence is subjected to substantial pressure opposing the rotation of the element. Not only does this contribute to attrition of particulate solid contacted with the rotatable element but also it impairs the efficient operation of the unit.

Accordingly, a principal object of the instant invention is the provision of a novel apparatus for removing particulate solid from the base of the contact zone in a continuous percolation apparatus which will obviate the aforementioned difficulties.

Another object of the invention is the provision of a novel apparatus for withdrawal of solids from the base of a contact zone in an apparatus for conducting a continuous percolation process which is so constructed and arranged that the gravitating mass of particulate solid and liquid feed pass through the contact zone in true countercurrent flow and said solids is discharged from the apparatus without establishing turbulence and with substantially no degradation of solid taking place, thereby permitting the realization of a true counter-current operation of maximum efficiency and economy.

A more specific object of the invention is to provide such an apparatus in which there is included a collecting device at the base of the columnar mass which is capable of removing solids over the entire area of said base without introducing turbulence in the residual columnar mass and without particle size degradation of solid occurring during said removal.

Another object of the invention is the provision of such an apparatus in which the rotatable members bear only a small fraction of the pressure load due to the weight of the columnar mass of particulate solid, thereby improving the efficiency of the apparatus and also eliminating solid degradation during contact of solid with rotatable members.

A still further object of the invention is the provision of such an apparatus which includes a plurality of rotatable radial vanes capable during rotation of positively controlling the rate of gravitation of particulate solid through the contact zone and simultaneously causing particulate solid contacted therewith to be moved into contact with an elevating screw; the vanes are so located and mounted that pariculate solid contacted therewith is not subject to substantial pressure, thus eliminating the possibility of particle size reduction of said solid taking place during contact of the solid with the vanes.

Other objects and features of the present invention will be apparent from the detailed description which follows and accompanying drawings in which.

Figure 1:
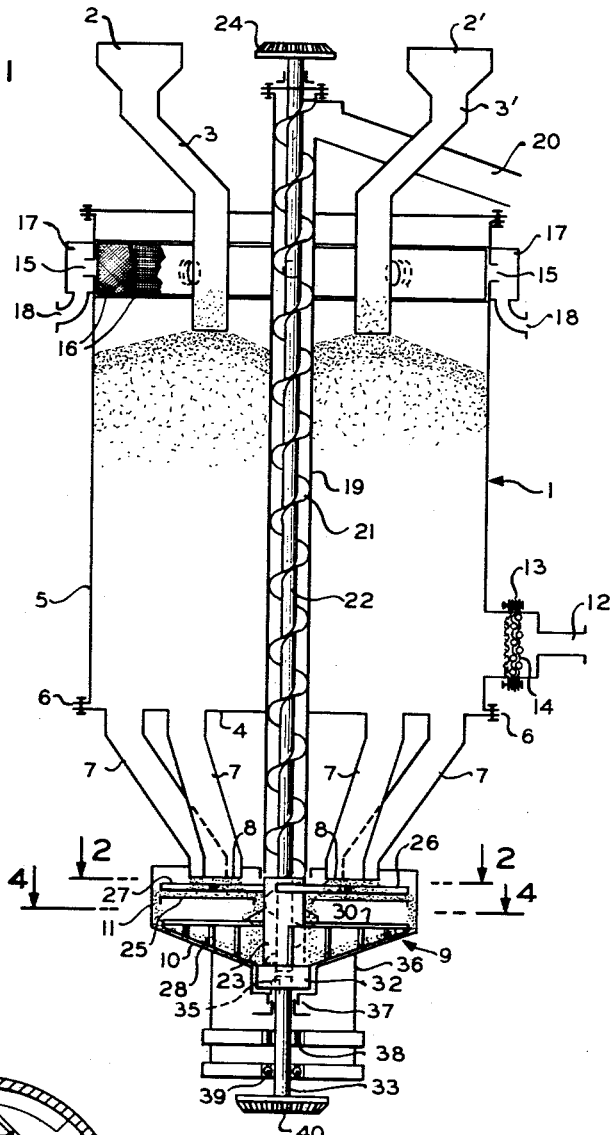
FIGURE 1 is a diagrammatic view, partially in section, showing one embodiment of the apparatus of the present invention.

Briefly stated, in accordance wtih the present invention, there is provided an apparatus adapted for continuous countercurrent treatment of a particulate solid with a liquid by continuously passing the liquid upwardly through interstices in a columnar mass of particulate solid which is continuously gravitating downwardly, the apparatus including a columnar vessel adapted for continuous downward movement of the particulate solid therethrough in the form of a columnar mass and having a base for supporting the columnar mass, first inlet means for introducing particulate solid into said columnar vessel, second inlet means located below said first inlet means for introducing liquid feed, liquid outlet means located above said second inlet means and preferably above the top of the columnar mass for continuously withdrawing contacted liquid from the columnar vessel, a chamber located below the columnar vessel and of substantially smaller volumetric capacity than the columnar vessel, a plurality of distributory outlets of restricted area provided in the base of said columnar vessel, each distributory outlet terminating in an open end within the chamber, thereby establishing communication between said columnar vessel and said chamber, a vertically positioned elevating screw mounted for rotatable movement within the columnar vessel and the chamber with the lower extremity of the screw terminating at a point above the base of the chamber, a casing enveloping said elevating screw and having its lower end open and spaced from the lower end of said chamber above the lower extremity of said elevating screw whereby particulate solid may be conveyed upward from said chamber through the casing, a discharge outlet adjacent the upper end of the casing for discharging particulate solid conveyed through the casing tube, means associated with said distributory outlets for controlling flow of particulate solid through the distributory outlets and into the chamber whereby particulate solid may be continuously removed uniformly over substantially the entire base of the columnar mass in said columnar vessel, thus preventing substantial turbulence of the remaining particulate solid during continuous movement thereof downwardly within the columnar vessel, and means in said chamber for urging particulate solid into contact with said elevating screw for removal through said casing.

Generally, the means for regulating the progress of particulate solid from the columnar vessel into the chamber comprises a solid surface, such as a plate, associated with the lower open extremities of the distributory outlets communicating the columnar vessel with the chamber in such a manner as to normally prevent flow of particulate solid through said distributory outlets and means for periodically removing solid from the area between the open end of each of said distributory outlets and said plate, whereby particulate solids from said columnar vessel periodically flows downwardly through each distributory outlet to replace the particulate solid thus removed.

The preferred means for controlling the flow of solid from the columnar vessel into the chamber comprises an annulus horizontally located in the chamber in such a manner that normally flow of particulate solid through the distributory outlets is prevented, and a plurality of vanes rotatable as a unit about the vertical axis of the screw and located intermediate the lower open extremities of the distributory outlets and the annulus in a maner such that when the vanes are rotated particulate solid deposited on the annulus through a distributory outlet is periodically removed therefrom when contacted by a vane. The outer periphery of the annulus terminates short of the walls of the chamber. The vanes, which preferably have a V-shape configuration, extend outwardly in a radial direction substantially coextensive with the annulus whereby particulate solid swept from the annulus passes downwardly over the inner periphery and outer periphery of the annulus to the base of the chamber. Means are provided below the annulus to remove particulate solid from substantially the entire base of the chamber into contact with the elevating screw which seizes the particulate solid and conveys it upwardly in a confined path through the chamber and columnar vessel to discharge.

Since the rotating vanes have a small dimension transverse to the path of the downwardly moving columnar mass, they are subjected to minimal pressure due to the weight of the columnar mass, this weight being supported by a stationary plate means below the vanes. It is essential that the vanes be spcaed from the stationary support so that degradation of particulate solid by attrition be obviated when the solid flows inwardly over the support into contact with the elevating screw, and so that both the upper and lower surfaces of the vanes are available to direct the flow of solids contacted therewith.

The invention will be more readily understood by reference to the attached drawings.

Figure 2:
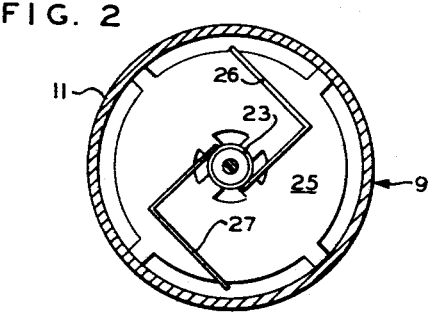
FIGURE 2 is a plan view taken along the line 2—2 in FIGURE 1 showing the configuration of the vanes.
Figure 3:
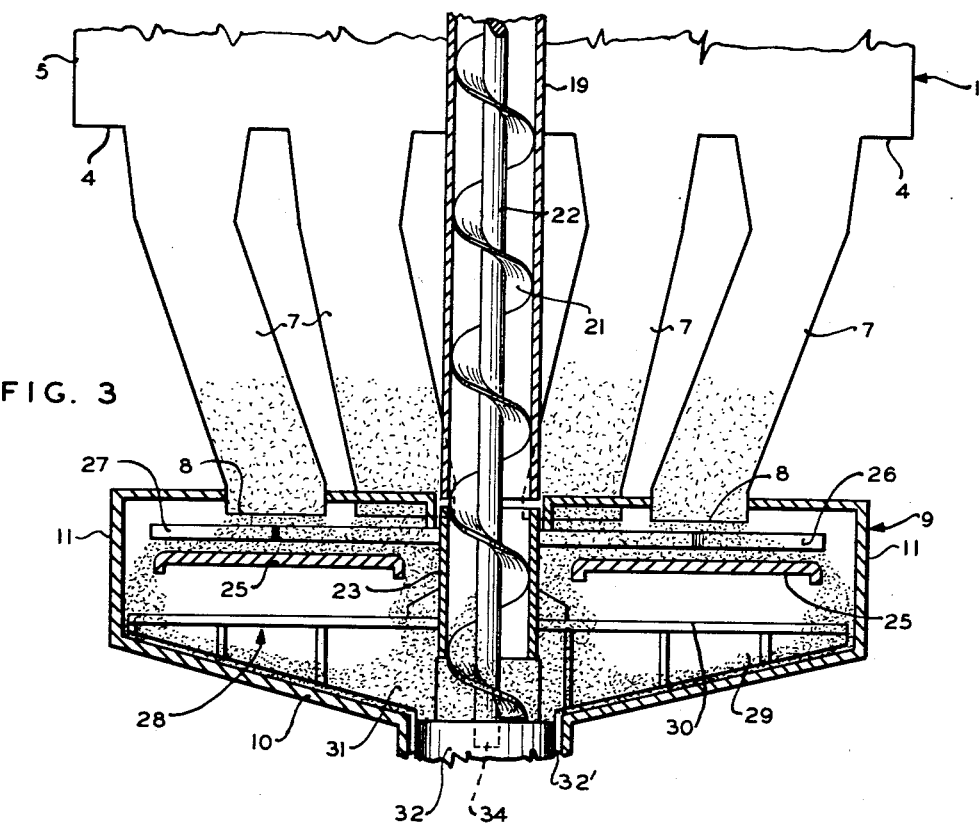
FIGURE 3 is an enlarged fragmentary elevational view, partially in section, showing the lower end of the apparatus of FIGURE 1 and illustrating the path of particulate solid through the lower end of the apparatus.

Referring to FIGURES 1, 2 and 3, inclusive, numeral 1 refers generally to a columnar vessel, preferably a vessel of cylindrical configuration. The particulate solid may be introduced in columnar vessel 1 by a plurality of hoppers, designated as 2 and 2' through tubes 3 and 3', respectively into columnar vessel 1 through which it passes in the form of a columnar mass. If so desired, only one hopper may be used, although preferably at least two hoppers are used to encourage uniform feed of solid to the columnar mass. The particulate solid fills a substantial portion of the columnar vessel 1 at all times and, when two hoppers are used (as shown) assumes a natural angle of repose as indicated in FIGURE 1. Preferably, at least two hoppers are used, although if desired, one hopper may be used satisfactorily.

It is to be understood that when the particulate solid is an adsorbent, such as is used in the treatment of an organic liquid mixture to fractionate said mixture into two or more components, the adsorbent introduced into adsorption column 1 may comprise either fresh adsorbent or regenerated adsorbent, or a mixture thereof. Since apparatus for continuous regeneration is well-known to those skilled in the art and forms no part of the present invention, such apparatus has been omitted from the drawings. It is to be recognized, however, that any suitable adsorbent regeneration equipment may be employed with the apparatus of this invention. Similarly, appropriate associated treating equipment may be used in conjunction with the apparatus of the instant invention when employing other liquids and particulate solids.

Columnar vessel 1 is closed at its lower end as by support plate 4 which preferably is releasably connected to column wall 5 as by means of angle irons and nut and bolt assemblies 6. Support plate 4 functions to support the columnar mass of particulate solid in vessel 1 and is preferably flat in configuration. A plurality of laterally spaced depending conduits 7 extend substantially uniformly over plate 4 of columnar vessel 1, and terminate in an open end 8 in enclosed chamber 9 located below and concentric with columnar vessel 1. Conduits 7 are adapted to convey the particulate solid from the columnar mass into enclosed chamber 9 which is provided with slightly tapered base walls 10. The conduits positioned nearest the periphery of support plate 4 terminate within the chamber 9 at a position short of the side walls 11 of the chamber.

The liquid feed which is to be contacted with the particulate solid is fed into columnar vessel 1 from a suitable feed storage, not shown, through feed inlet 12 in column wall 5 near the base of vessel 1. Feed inlet 12 preferably is comprised of two flanged sections which are secured together, as shown, by nut and bolt assemblies 13, one of said flanged sections being formed integrally with column wall 5. Nut and bolt assemblies 13 also function to clamp a pair of screens 14 between the abutting flanged sections of feed inlet 12 and in the path of flow of the feed mixture, thereby to prevent sand, grit, and other undesirable solid particles, which might be contained in the feed, from entering the columnar vessel. It will be understood that the liquid feed may be fed into the chamber or into the conduits, if so desired.

In the columnar vessel, the feed flows upwardly through the columnar mass of particulate solid which is passing downwardly in countercurrent flow. The feed, subsequent to contact with the columnar mass of particulate solid, passes from vessel 1 through one or more outlets 15. While outlets 15 are shown in FIGURE 1 as being above the columnar mass of particulate solid in the vessel, it is to be understood that they may be located below the upper extremity of the columnar mass, such as slightly above the midpoint of the columnar vessel.

For the purpose of substantially preventing the passage of particulate solid out of the column with the effluent liquid, screens 16 are secured to the inner wall of columnar vessel 1 over outlets 15. In order to insure uniform flow of the columnar mass of particulate solid through the columnar vessel 1, screens 16 preferably are welded or otherwise secured directly to the wall of the column.

The effluent liquid fraction passing through outlets 15 is collected in annular channel 17 formed by the wall 5 of vessel 1 and a channel bar secured to or formed integrally with said wall, in the position shown in FIGURE 1. From there the effluent liquid passes through nipples 18 and thence to additional treating facilities or to storage, not shown, as desired.

As above pointed out, in accordance with this invention there is provided means for continuously removing solid uniformly over substantially the entire area of the base of the columnar mass and passing said solid upward through a confined path within the columnar mass in a manner to prevent degradation, as by attrition of said solid, and to prevent turbulence of the remaining particulate solid during movement of said remaining particulate solid downwardly within the columnar vessel. Such means includes an elongated screw casing 19 of relatively small diameter in comparison with the diameter of vessel 1, secured by welding or the like within the adsorption column and in axial alignment therewith, as shown. A portion of casing 19 extends beyond the upper end of the vessel 1 and has provided therein discharge spout 20. Casing 19 terminates adjacent the upper wall of chamber 9 in an open end and is substantially continuous with collar 23, as shown, or may be mounted therein in running fit. Elevating screw 21 is mounted for rotatable movement on shaft 22 within casing 19. The upper end of screw 21 extends through a bearing and is provided with gear 24 through which screw 21 may be rotated by a suitable drive mechanism, not shown. The lower end of elevating screw 21 projects through the lower open end of collar 23, and terminates a short distance above the lower end of chamber 9.

The particulate solid flowing downwardly through the columnar vessel through conduits 7 is deposited on stationary annular plate 25, suitably mounted in chamber wall 11, suitably by angle irons secured to the walls of chamber.

The apparatus for controlling the rate of flow from the columnar vessel into chamber 9 will be described hereinafter. As illustrated in FIGURE 3, annuli are provided between chamber wall 11 and the outer periphery of plate 25 and between inner periphery of plate 25 and collar 23 enclosing the upper portion of elevating screw 21 that is disposed in chamber 9. Collar 23 is rotatable independent of the rotation of screw 21 by means hereinafter to be described. It will be understood that, if so desired, the annulus between the inner periphery of plate 25 and collar 23 may be omitted and collar 23 may be designed for running fit within plate 25.

Figure 5:
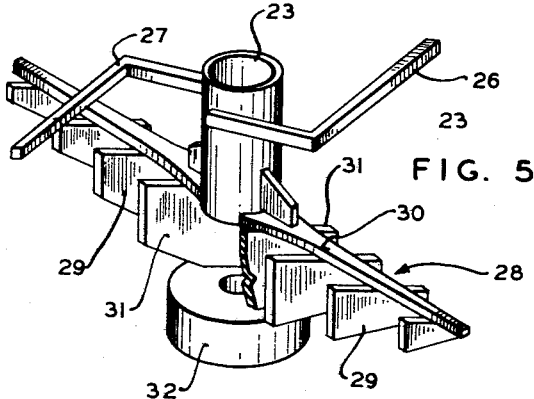
FIGURE 5 is a perspective view of the rotary unit of FIGURE 1.

A plurality of horizontally disposed vanes, 26 and 27, overlying plate 25 and spaced therefrom, are fixedly secured, as by welding, to the periphery of collar 23 and extend radially therefrom substantially to chamber wall 11 and coextensive with plate 25. The uppermost edge of vanes 26 and 27 in proximity to the lower open extremity of conduits 7 which terminate in chamber 9. The vanes extend outwardly towards the side walls of chamber 9 to a point beyond the outer extremity of outermost conduits 7 in the chamber. This is to prevent spillage of particulate solid into chamber 9 prior to contact of said solid with the vanes. The lower edges of vanes 26 and 27 are spaced above plate 25 a suitable distance to prevent attrition of particulate solid taking place when said vanes are rotated; in theory, the optimum distance is approximately three times the diameter of the largest particle of particulate solid. The vanes have a generally V-shape configuration as shown in FIGURE 2 and FIGURE 5 and are so disposed on rotatable collar 23 that when rotated therewith as a unit particulate solid contacted with both the upper and lower surfaces of the vanes will be caused to move radially into contact with the annuli provided intermediate chamber wall 11 and plate 25 and collar 23 and plate 25, as shown in FIGURES 1, 3, 6 and 7. During their rotation the lower surface of the vanes sweeps the deposit of particulate solid from successive portions of the upper surface of plate 25 through the annuli whereby particulate solid from the columnar vessel gravitates serially through conduits 7 to replenish the deposit of particulate solid on plate 25. Hence, the rotation of the vanes relative to plate 25 provides in effect, a valve to control the rate of flow of solid effluent from the contact zone in the columnar vessel 1 into chamber 9.

It will be understood that the number and configuration of the vanes may vary from that shown. For example, four or more vanes may be employed if desired. Furthermore, the taper of the vanes may be altered from that illustrated, e.g., the vanes may taper, preferably from the inner edge to the outer edge. The limitation to the configuration of the vanes is that particulate solid be radially removed uniformly from plate 25 and then downwardly into contact with elevating screw 21 without scraping or otherwise causing degradation of solid.

Figure 4:
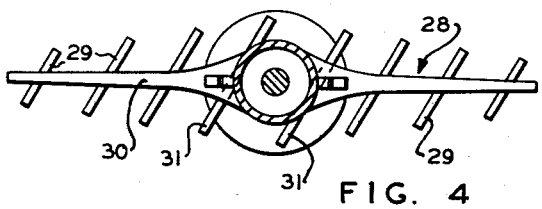
FIGURE 4 is a plan view taken along the line 4—4 in FIGURE 1 showing the mounting of the plows.

A plurality of plow units, indicated generally by numeral 28 are mounted for rotation below plate 25 and adjacent the base of chamber 9. Each plow unit comprises a plurality of depending plow members, 29, each laterally spaced from the other plow members in the plow unit, and individual plow members mounted adjacent their upper surface to radial arm 30, as by welding. Plow members are inclined slightly towards the elevating screw, as illustrated in FIGURE 4, to encourage positive flow of particulate solid contacted therewith to the elevating screw. Adjacent its upper end, the innermost plow member 31 of each plow unit is fixedly secured to collar 23 as by welding. The lower edge of innermost plow members 31 is welded to the upper face of rotor hub 32 mounted in running fit in aperture 33 at the midpoint of base of chamber 9. The upper face of hub is preferably located substantially flush with the base of chamber 9 and continuous with the tapered side walls 10, as illustrated. Core 34 centrally located within rotor hub 32 is adapted to receive the lower extremity of shaft 22 in running fit. Hence, vanes 26 and 27, collar 20 and plow units 28 are rotatable by hub 32 independently of the rotation of elevating screw 21 and preferably in a direction in opposition thereto. Hub 32 is mounted for rotatable movement on axial shaft 33 which extends through the lower portion of core 34 in hub 32. Shaft 33 is secured to hub 32 by any suitable means, such as by a sliding key assembly 35, illustrated in FIGURE 1. The hub is rotatable in a plane normal to the axis of the columnar vessel and independent of the rotatable movement of elevating screw 21. The hub may be rotated in the same direction as the elevating screw or in opposition thereto, the latter ordinarily being preferred. In operation, it is desirable to rotate hub at a relatively low speed, such as for example 0.25 to 10.0 r.p.m. in order to prevent liquid turbulence which would occur if the hub were to rotate at higher speeds. Usually the elevating screw will operate at a somewhat higher speed than hub 32. The diameter of hub 32 is preferably not substantially in excess of that of the casing 19 since it is desirable to prevent the rotary element from bearing the pressure due to the weight of the load in chamber 9.

The lower end of shaft 33 is preferably disposed in housing 36 wherein it suitably passes through gland 37 to prevent egress of the contents of the chamber 9, roller bearing 38 and ball bearing 39, and is provided with gear 40 through which hub 32 may be rotated by a suitable drive mechanism, not shown.

Figure 6:
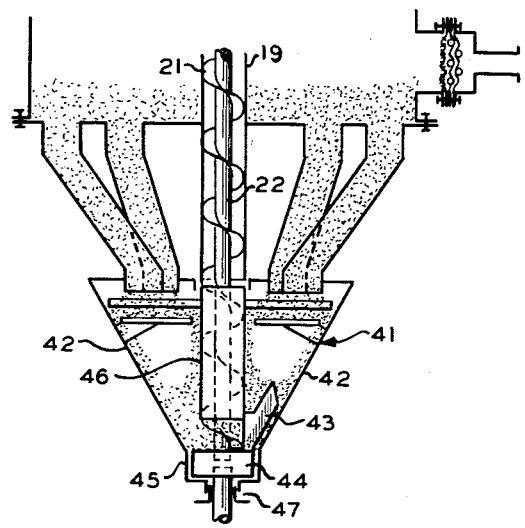
FIGURE 6 is a diagrammatic view showing the lower end of another embodiment of the continuous percolation apparatus of the invention.

FIGURE 6 illustrates another embodiment of the invention in which chamber 41 is provided with sharply tapered side walls 42 which serve to urge particulate solid adjacent the base of the chamber into contact with the lower extremity of the elevating screw for ultimate discharge. In this construction the plow unit may comprise a single plow 43 which is fixedly secured to the upper face of rotor hub 44 mounted in running fit at the midpoint of the base 45 of chamber 41 and to collar 46. Base 46 is sealed by gland 47. In other respects the apparatus is substantially identical to that of FIGURES 1 and 3.

Figure 7:
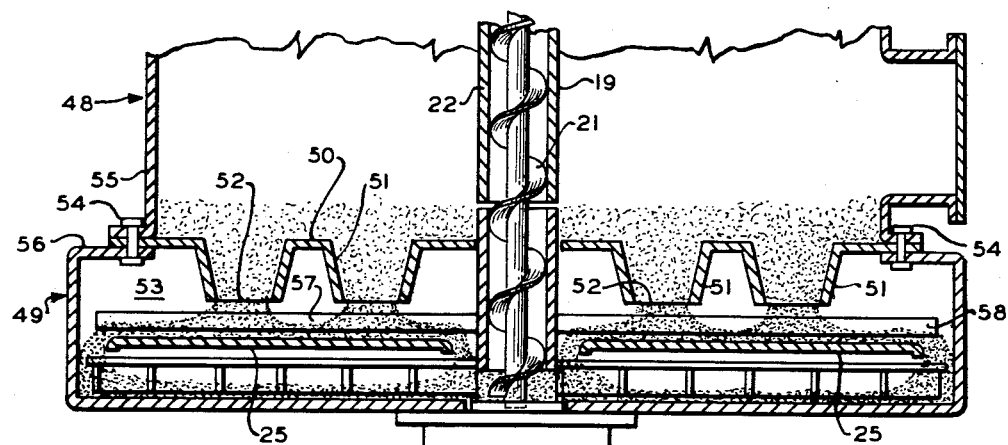
FIGURE 7 is a fragmentary elevational view, partially in section, showing another embodiment of the apparatus of the present invention.

FIGURE 7 illustrates still another embodiment of my invention in which the lower end of columnar vessel 48 terminates in chamber 49 which has a diameter somewhat in excess of columnar vessel 48. End plate 50 at the base of columnar vessel 48 is provided with a series of laterally spaced depending nipples 51 which are located substantially uniformly over that area of the end plate 50 which is in contact with the gravitating particulate solid in the chamber. Nipples 51 terminate in open end 52 within chamber 53 which is mounted to the lower end of columnar vessel 48 and to end plate 50 by nut and bolt assemblies 54, one of the flanged sections being formed integrally with the side walls 55 of columnar vessel 48 and the other being formed integrally with upper wall 56 of chamber 49. The rotary unit is disposed within chamber 49, as in FIGURE 1, with vanes 57 and 58 being so positioned that their upper surface is proximate the lower open ends 52 of nipples 51 whereby the vanes can control the flow of particulate solid downward from the base of columnar vessel 48 through nipples 51 and onto annulus 25 spaced below the vanes in chamber 49. It is essential that the outer periphery of annulus 25 extend laterally within the chamber to a point at which particulate solid flowing downwardly through the outer extremity of the outermost nipple is deposited in the chamber so that flow of effluent solid from the outermost nipples is controlled by the vanes 57 and 58 in cooperation with annulus 25.

During operation of the apparatus shown in FIGURES 1 and 3, particulate solid is fed into hoppers 2 and 2' and through tubes 3 and 3', respectively, into the columnar vessel wherein a columnar mass of particulate solid is formed. The top of the columnar mass assumes the angle of repose indicated in FIGURE 1. Liquid feed is fed into vessel 1 through inlet 12 simultaneously with the introduction of particulate solid and flows upwardly through interstices in the columnar mass in a direction countercurrent to that of the columnar mass. After passing upwardly through the columnar mass the contacted liquid is withdrawn at a plurality of outlet points 15. The outlets 15 are located above the upper surface of the columnar mass, thus providing so-called "wet head" operation. The purpose of operating under such a condition is to prevent possible cavitation of the columnar mass which might occur if the contacted liquid were withdrawn below the upper surface of the columnar mass. It will be understood, however, that by appropriate selection of particulate solid and flow rates, cavitation may be avoided even when contacted liquid is withdrawn below the upper surface of the columnar mass.

Simultaneously, particulate solid is removed from substantially the entire face of plate 4 downwardly through conduits 7 and onto the upper face of annular plate 25 in chamber 9. The flow rate of the gravitating solid through conduits 7 is controlled by radial vanes 26 and 27 which, during rotation, act as a valve by sweeping solids from the consecutive portions of the upper face of annular plate 25 through the annuli adjacent the inner and outer peripheries of the annular plate 25 and downward to the base of chamber 9. This is most clearly illustrated in FIGURE 3. Simultaneous with the continuous removal of solid from consecutive areas of the annular plate 25, particulate solid flows downwardly continuously through consecutive conduits 7 to replace the solid removed by the vanes. The solids discharged downwardly through the annuli are urged into contact with the end of elevating screw 21 which projects below the lower open end of collar 23 by plow units 28 which direct particulate solid contacted therewith inwardly toward the elevating screw 21 which seizes the solids and conveys them upwardly through casing 19 confined in the columnar mass in columnar vessel 1 and then to discharge through spout 20.

The operation of the apparatus shown in FIGURES 6 and 7 is substantially the same as that of the apparatus shown in FIGURE 1. However, in the apparatus of FIGURE 6 the particulate solid discharged from the support plate is urged into contact by another means. In the operation of the apparatus shown in FIGURE 6 the tapered base below the support plate serves to direct the gravitating solid inwardly into contact with the elevating screw disposed in the tapered base and plow members are reduced in number.

As mentioned hereinabove, the apparatus of my invention is useful in the continuous countercurrent contact of a wide variety of liquids with an appropriate particulate granular solid. Such continuous countercurrent contacting may be for such purposes as effecting interaction between reactible constituents of a liquid and a solid, as in the case of certain ion exchange reactions, or leaching of a particulate solid by a liquid capable of extracting the desired constituent of the solid. The apparatus of the invention is particularly suitable for continuous separation of any component or components from a liquid mixture, aqueous or nonaqueous, which are capable of being separated from the mixture by selective adsorption. For example, the apparatus is useful in separating color bodies from hydrocarbons in the decolorization of lube oil, separating color bodies from sugar solutions, removal of olefins from kerosene, desulfurization of kerosene, gasoline, etc., degumming and deasphaltizing lube oil. A variety of granular percolation adsorbents may be used in the novel apparatus, the choice being predicated on the nature of the liquid feed and the properties desired of the treated liquid. Examples of suitable granular percolation adsorbents are fullers earth, activated carbon, silica gel, activated alumina and activated magnesium.

The optimum conditions of temperature, rate of flow of particulate solid and liquid feed, etc. will vary with the nature of the liquid and particulate solid being contacted and are well-known to those skilled in the art or readily determined by well-established systems of calculation.

I claim:

1. In an apparatus adapted for continuous countercurrent contact of a liquid with a particulate solid by percolation of the liquid through a columnar mass of the particulate solid, said apparatus comprising a vertically disposed columnar vessel adapted for continuous downward movement of said particulate solid therethrough in the form of a columnar mass, said columnar vessel including a base for supporting said columnar mass, first inlet means for introducing particulate solid into said columnar vessel, second inlet means located below said first inlet means for introducing liquid feed, liquid outlet means located above said second inlet means for continuously withdrawing contacted liquid from said columnar vessel; the combination therewith of a chamber located below said columnar vessel and of substantially smaller volumetric capacity than said columnar vessel, a plurality of distributory outlets of restricted area provided in the base of said columnar vessel, each disrtibutory outlet terminating in an open end within said chamber, thereby establishing communication between said columnar vessel and said chamber, a vertically positioned elevating screw mounted for rotatable movement within said columnar vessel and said chamber with the lower extremity of said screw terminating at a point above the base of said chamber, a casing enveloping said elevating screw and having its lower end open and spaced from the lower end of said chamber above the lower extremity of said elevating screw whereby particulate solid may be conveyed upward from said chamber through said casing, a discharge outlet adjacent the upper end of the casing for discharging particulate solid conveyed through said casing, stationary plate means disposed in said chamber below the open end of each of said distributory outlets and spaced therefrom in a manner to restrict flow of particulate solid through said distributory outlets so that normal flow of said particulate solid through said distributory outlets is prevented, means for periodically removing particulate solid from the area between the open end of each of said distributory outlets and said plate for controlling flow of particulate solid through said distributory outlets and into said chamber whereby particulate solid may be continuously removed uniformly over substantially the entire base of the columnar mass in said columnar vessel, thus preventing substantial turbulence of the remaining particulate solid during continuous movement thereof downwardly within the columnar vessel, and means in said chamber for urging particulate solid into contact with said elevating screw for removal through said casing.

2. The apparatus of claim 1 whereby said plate means is horizontally positioned in the chamber with the outer periphery thereof terminating short of the walls of said chamber thereby to provide a passage for particulate solid adjacent the outer periphery of said plate.

3. The apparatus of claim 1 wherein said means for periodically removing particulate solid between the open end of each of said distributory outlets and said plate comprises a plurality of vanes rotatable as a unit about the vertical axis of said elevating screw, each vane extending substantially between the side walls of said chamber and said casing and being stationed intermediate said plate and the open end of said distributory outlets and spaced therefrom in a manner such that when rotated will cause particulate solid to pass over said plate without attrition thereof.

4. In an apparatus adapted for continuous countercurrent contact of a liquid with a particulate solid by percolation of the liquid through a columnar mass of the particulate solid, said apparatus comprising a vertically disposed columnar vessel adapted for continuous downward movement of said particulate solid therethrough in the form of a columnar mass, said columnar vessel including a base for supporting said columnar mass, first inlet means for introducing particulate solid into said columnar vessel, second inlet means located below said first inlet means for introducing liquid feed, liquid outlet means located above said second inlet means for continuously withdrawing contacted liquid from said columnar vessel; the combination therewith of a chamber located below said columnar vessel and of substantially smaller volumetric capacity than said columnar vessel, a plurality of distributory outlets of restricted area provided in the base of said columnar vessel, each distributory outlet terminating in an open end within said chamber, thereby establishing communication between said columnar vessel and said chamber, a vertically positioned elevating screw mounted for rotatable movement within said columnar vessel and said chamber with the lower extremity of said screw terminating at a point above the base of said chamber, a casing enveloping said elevating screw and having its lower end open and spaced from the lower end of said chamber above the lower extremity of said elevating screw whereby particulate solid may be conveyed upward from said chamber through said casing, a discharge outlet adjacent the upper end of the casing for discharging particulate solid conveyed through said casing, a stationary horizontal plate disposed in said chamber below the open end of each of said distributory outlets and spaced therefrom in a manner to restrict flow of particulate solid through said distributory outlets so that normally flow of said particulate solid through said distributory outlets is prevented, the outer periphery of said plate terminating short of the walls of said chamber thereby to provide a passage for particulate solid adjacent the outer periphery of said plate, a plurality of vanes rotatable as a unit about the vertical axis of said elevating screw, each vane extending substantially between the side walls of said chamber and said casing and being stationed intermediate said plate and the open end of said distributory outlets and spaced therefrom in a manner such that when rotated will cause particulate solid to be continuously removed uniformly over substantially the entire base of the columnar mass in said columnar vessel without attrition thereof and while preventing substantial turbulence of the remaining particulate solid during continuous movement thereof downwardly within the columnar vessel, and means in said chamber for urging particulate solid into contact with said elevating screw for removal through said casing.

5. The apparatus of claim 1 wherein said plate means comprises a stationary annulus horizontally positioned in the chamber with the outer periphery thereof terminating short of the walls of said chamber thereby to provide a passage for particulate solid adjacent the outer periphery of said plate and the inner periphery of said annular plate terminating short of the casing thereby to provide a second passage for particulate solid adjacent the inner periphery of said annular plate, and said means for periodically removing particulate solid between the open end of each of said distributory outlets and said plate comprises a plurality of vanes rotatable independently of the rotation of said elevating screw as a unit about the vertical axis of said elevating screw, each vane extending substantially between the side walls of said chamber and said casing and being positioned intermediate said annular plate and the open end of said distributory outlets and spaced therefrom in a manner such that when rotated will cause particulate solid to pass over the inner and outer peripheries of said annular plate without substantial attrition thereof and downwardly through the passages adjacent the inner and outer peripheries of said annular plate.

References Cited in the file of this patent

UNITED STATES PATENTS

| | | |
|---|---|---|
| 816,775 | Brauer | Apr. 3, 1906 |
| 1,454,610 | Wolf | May 8, 1923 |
| 1,779,571 | Ullgren | Oct. 28, 1930 |
| 2,696,305 | Slover | Dec. 7, 1954 |
| 2,731,424 | Shabaker | Jan. 17, 1956 |
| 2,750,073 | Coffman | June 12, 1956 |
| 2,762,510 | Gwyn | Sept. 11, 1956 |

UNITED STATES PATENT OFFICE
CERTIFICATE OF CORRECTION

Patent No. 3,003,641                                October 10, 1961

Carl D. Laughlin

It is hereby certified that error appears in the above numbered patent requiring correction and that the said Letters Patent should read as corrected below.

Column 1, line 21, for "grandular" read -- granular --; line 23, for "said" read -- solid --; column 2, line 12, for "undersirable" read -- undesirable --; column 3, line 6, for "solids" read -- solid --; column 4, line 70, for "spcaed" read -- spaced --; column 9, lines 62 and 63, for "disrtibutory" read -- distributory --.

Signed and sealed this 19th day of June 1962.

(SEAL)
Attest:

ERNEST W. SWIDER                                      DAVID L. LADD
Attesting Officer                                          Commissioner of Patents